United States Patent [19]

Everett et al.

[11] Patent Number: 5,620,062
[45] Date of Patent: Apr. 15, 1997

[54] BICYCLE BRAKE SHOE ASSEMBLY

[76] Inventors: Richard C. Everett, 225 Sunshine La., West Linn, Oreg. 97068; Mark Rosenberger, 13235-116 St., Edmonton, Alberta, Canada, T5E 5H8

[21] Appl. No.: 627,361

[22] Filed: Apr. 5, 1996

[51] Int. Cl.⁶ ............................................ F16D 65/78
[52] U.S. Cl. ..................... 188/24.12; 188/73.1; 188/250 B
[58] Field of Search .......................... 188/24.11, 24.12, 188/24.19, 24.21, 24.22, 73.1, 250 B, 250 E; 403/11, 12, 13, 14

[56] References Cited

U.S. PATENT DOCUMENTS

| | | | |
|---|---|---|---|
| 2,470,282 | 5/1949 | Baker et al. | 403/14 |
| 4,036,333 | 7/1977 | Mathauser | 188/24.12 |
| 4,185,935 | 1/1980 | Bierlein | 403/14 |
| 4,391,353 | 7/1983 | Mathauser | 188/24.12 |
| 4,441,592 | 4/1984 | Everett | 188/24.12 |
| 4,470,483 | 9/1984 | Holtz | 188/24.12 |

FOREIGN PATENT DOCUMENTS 662788 12/1951 United Kingdom ............... 188/24.12

*Primary Examiner*—Robert J. Oberleitner
*Assistant Examiner*—Chris Schwartz
*Attorney, Agent, or Firm*—Edward E. Roberts

[57] ABSTRACT

A bicycle brake shoe assembly for eliminating the need for readjustment of the brake pad relative to the rim upon replacement of a pad with a like pad and having an elongate tubular stem secured with an opening in a stem clamp device of a brake lever, and an elongate brake pad. One end of the stem and an adjoining surface of the pad are provided with matingly configured portions for providing a fixed orientation of the pad relative to the stem. A bolt passes through the bore of the stem into engagement with a threaded opening in the adjoining surface to hold the parts together. In one embodiment, the parts are formed with an oval, or non-circular recess in the adjoining surface with the end portion of the stem being matingly configured. In another embodiment, the pad is provided with a generally cylindrical stub with a threaded opening, the stub having a diameter generally equal to the diameter of the stem. With the adjoining ends being V-shaped, one male and the other female.

8 Claims, 2 Drawing Sheets

BICYCLE BRAKE SHOE ASSEMBLY

BACKGROUND OF THE INVENTION

The background of the invention will be discussed in two parts:

1. Field of the Invention

This invention relates to bicycle brakes and more particularly to a bicycle brake assembly having a hollow elongate stem affixed relative to the brake lever, which may be a caliper or a cantilever brake member, and a brake pad attachable thereto by a bolt extending through the opening. One end of the stem and the adjoining portion of the pad are matingly configured for providing a fixed orientation of the pad relative to the brake lever on the replacement of the pad.

2. Description of the Prior Art

Modern bicycles have brake assemblies mounted to the forks and frame for gripping of the rim in response to operator manipulation of brake levers. Such brake assemblies generally include brake shoes, which are movably mounted on brake lever assemblies, such as caliper assemblies which bridge the rim, or cantilever brake levers which attach to the forks on opposite sides of the rim. Such brake shoes have a brake pad of friction material for abuttingly and frictionally engaging the rim for slowing or stopping of the bicycle. The majority of such brake shoes are formed of a brake pad with an integrally formed fastening threaded shaft, with the pads typically molded about a metal member formed integrally with, or securely attached to, the stem.

For attachment to the caliper or brake lever, the stem is inserted through an aperture in the end of the lever with the pad in a position adjacent the rim, and a nut, or other suitable fastener is usually threaded to the other end of the stem to maintain the pad in a position adjusted relative to the rim. However, when replacing the pads, which may be done for reasons other than wear, this necessitates readjustment or realignment of the pad relative to the rim. Modern cyclists may replace the pads for different weather conditions, such as one set on pads for rain, another for dry, or other reasons, such as to provide clearance for flat tire removal of large tires such as mountain bike tires. The time involved in realignment may become critical, particularly if a brake shoe is being replaced during a race or other contest.

One such prior art brake shoe assembly is shown in FIG. 1, wherein there is shown in phantom illustration a bicycle rim 10, a cantilever brake arm, generally designated 12, and a brake shoe, generally designated 14. The brake shoe is a generally T-shaped member, having a threaded stem or shaft portion 14a and a generally orthogonally oriented elongate brake pad 14b. The brake arm 12 is provided with a stem clamp device 12a with an aperture 12b extending therethrough, the aperture 12b having a diameter generally equal to the diameter of the shaft 14a.

The outer surface of the shaft 14a is serrated longitudinally so that upon insertion into the aperture 12b there is a generally tight frictional engagement which minimizes rotation of the shaft 14a within the aperture 12b. The inner diameter of the aperture 12b may likewise be serrated in the longitudinal direction. Although not shown, the free end of the shaft 14a may be threaded for enabling attachment of a suitable fastener, such as a nut, or the like. Upon attachment of the shoe 14, the pad 14b is aligned relative to the rim 10 by positioning prior to insertion of the shaft 14, with readjustment often requiring repeated withdrawals and reinsertions. Consequently when brake shoes are replaced, a considerable amount of time may be wasted.

It is a feature of the present invention to provide a new and improved brake shoe assembly which virtually eliminates the need for realignment on pad replacement.

SUMMARY OF THE INVENTION

The foregoing and other objects of the invention are accomplished by providing a brake shoe assembly for attachment to the stem clamp device of a bicycle brake lever, the assembly including an elongate generally hollow support member configured for being frictionally received within a hole extending through the clamp device, and a brake pad member having a rim engaging surface and orientation means on the surface opposite the rim engaging surface, the orientation means and one end of the support member being matingly configured so that when matingly adjoined, a given orientation of the pad is defined relative to the rim. A fastener member, such as a bolt, is configured for passing through the bore of the support member into engagement with a threaded opening generally centrally positioned within the orientation means for enabling fixing the pad in the defined orientation.

In one embodiment, the orientation means includes matingly configured V-shapes on the adjoining ends of the shoe surface and the support member. In another embodiment, the surface is formed with a non-circular recess and the support member is provided with a matingly configured portion for fitting into the recess. In both embodiments, the mating configuration of the adjoined portions eliminate the need for realignment or readjustment of a brake pad member relative to the rim upon replacement with a like brake pad member.

Other objects, features and advantages of the invention will become apparent from a reading of the specification, when taken in conjunction with the drawings, in which like reference numerals refer to like elements in the several views.

DESCRIPTION OF THE PREFERRED EMBODIMENT

Figure 2:
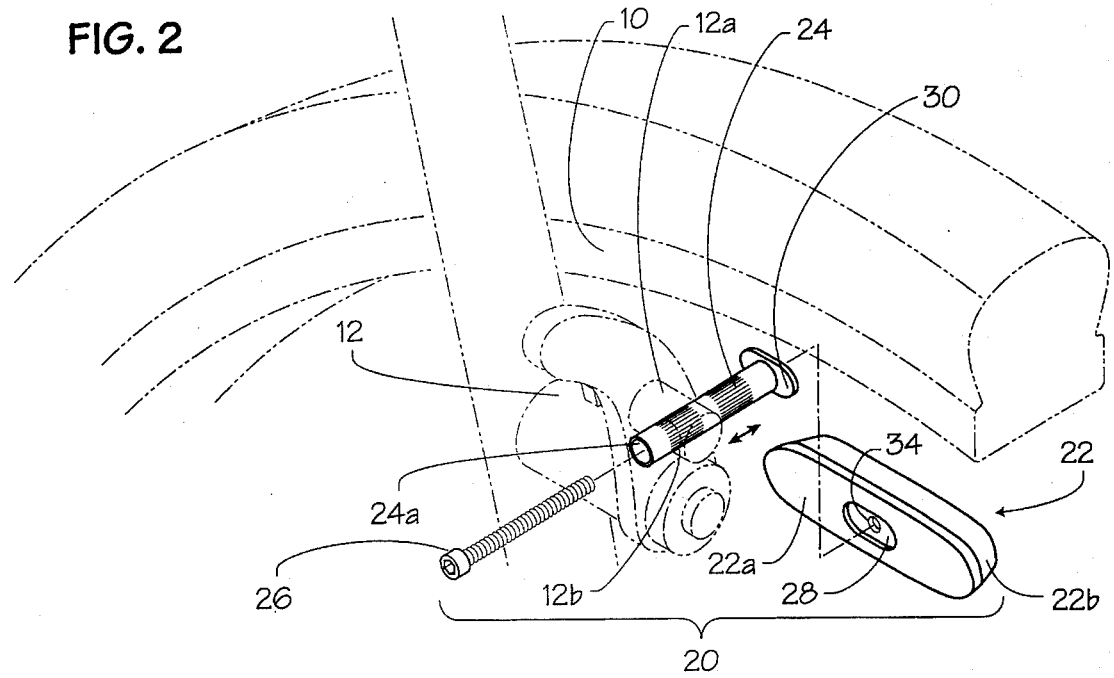
FIG. 2 is an exploded perspective view, partially in phantom illustration, of one embodiment of a brake shoe assembly according to the invention.

Referring now to the drawings, and particularly to FIG. 2 there is shown one embodiment of a brake shoe assembly, generally designated 20, for attachment to the stem clamp device 12 of the cantilever brake member 12 of a bicycle. As shown in exploded view, the assembly 20 includes three portions, these being a generally elongate brake pad, generally designated 22, a tubular or hollow stem 24 and a fastener such as a screw or cap end bolt 26.

Figure 1:
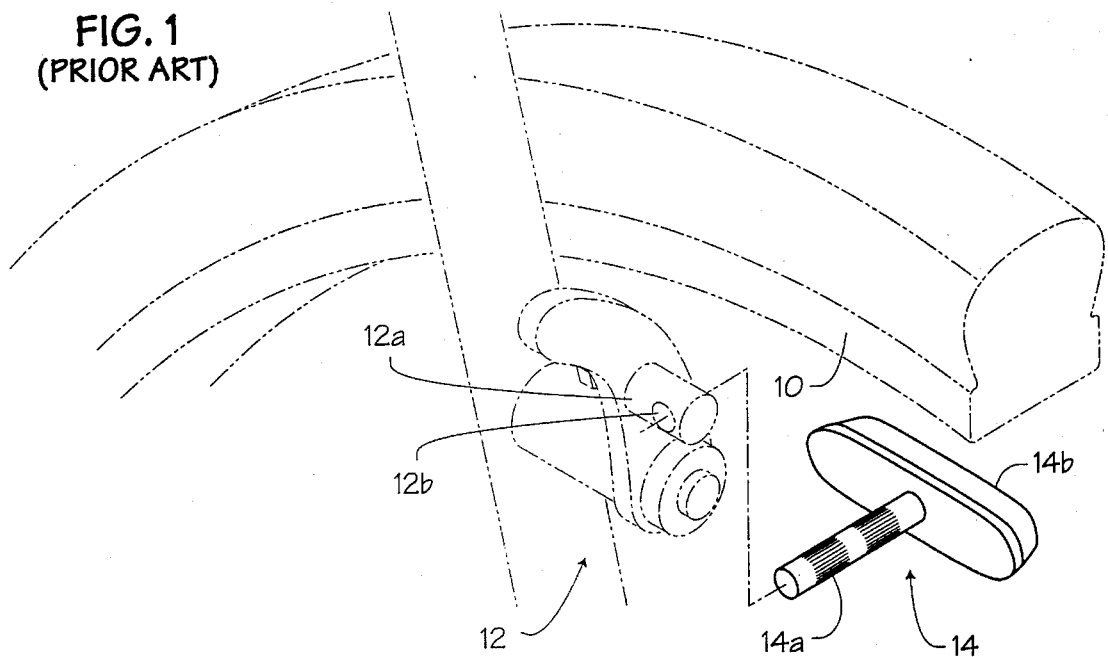
FIG. 1 is an exploded perspective view, partially in phantom illustration, of a prior art brake shoe assembly.

As discussed in connection with the prior art of FIG. 1, the inner surface of the hole 12b of the stem clamp device 12a is abraded or serrated in the axial direction of the hole. For frictional engagement with this hole, the stem 24 has the outer surface thereof likewise serrated for forcible positioning within the hole with minimal to no rotational movement. The hollow stem 24 is provided with an axial bore 24a therethrough. Alternatively, the stem 24 may be fixedly maintained in stem clamp device 12a by means of a set screw or other means.

The brake pad 22 is configured on the surface 22a opposite the frictional rim-engaging pad 22b with a non-circular, geometrically configured recess 28, which in the embodiment illustrated is an oval-shaped recess with the long axis thereof in alignment with the long axis of the brake pad 22. The adjacent, and adjoining end of the stem 24 has formed therewith, or attached thereto, a matingly configured plate 30 configured and dimensioned for being received tightly within the recess 28. For purposes of securing the parts together, the center of the recess 28 includes a threaded opening 34 of a diameter sufficient to received the threaded end of the bolt 26 therein.

In essence, with the plate 30 snugly within the recess 28 and the bolt passing through the bore of the stem 24 and tightened into the threaded opening 34 the parts are maintained with the pad 22 in a defined or fixed orientation relative to the stem 24, and consequently, relative to the rim 10. As a result, should a pad 22 be replaced with another like pad, after removal of the pad and installation of another one, the pad can be orientated in only one of two directions and, if the original pad 22 had been properly aligned, the replacement pad will occupy the identical orientation as the original, thus eliminating the need for time-wasting realignment of the replacement pad. This orientation will normally, and preferably be, with the long axis of the pad 22 aligned with the circumferential direction of rotation of the rim 10. This will obviously occur with the pad 22 in either of the two possible orientations.

Alternatively, although not shown, the stem 24 may include a non-circular nut-like protuberance for mating with a female receptor formed in the backbone of the brake pad, the screw or bolt 26 thus threaded into the female receptor portion of the brake pad backbone.

While the orientation means, in the form of recess 28 (and its coacting plate 30) has been shown as an oval shape in plan view, other non-circular shapes can be used for the recess, such as rectangular or triangular, with a like change to provide a matingly configured plate 30.

Figure 3:
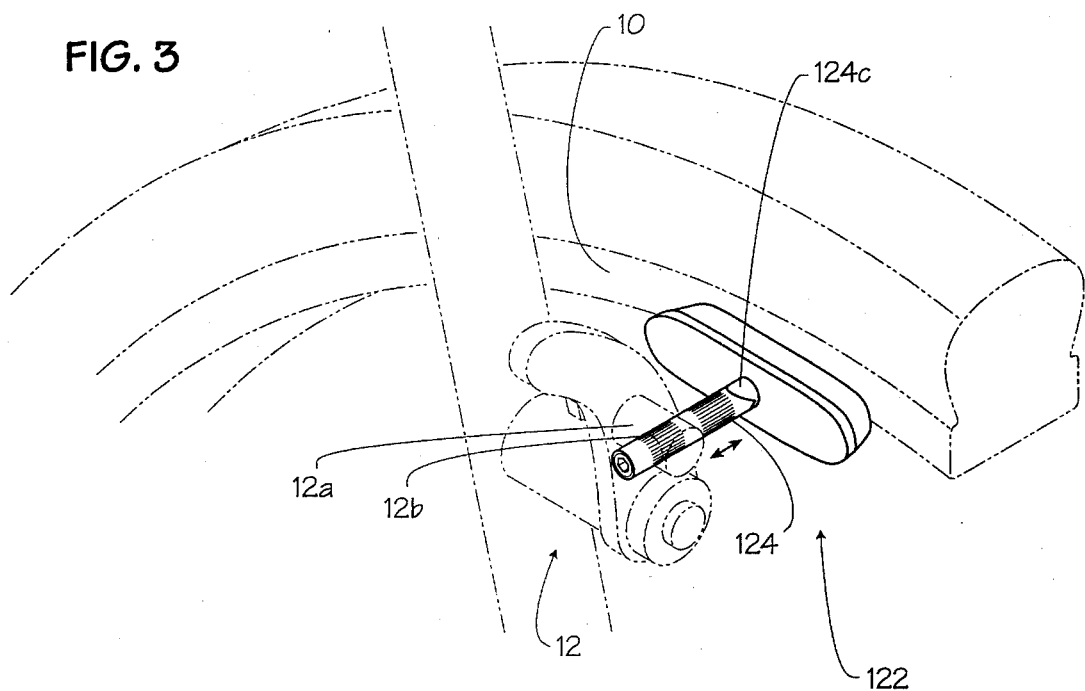
FIG. 3 is a perspective view, partially in phantom illustration, of another embodiment of a brake shoe assembly according to the invention.
Figure 4:
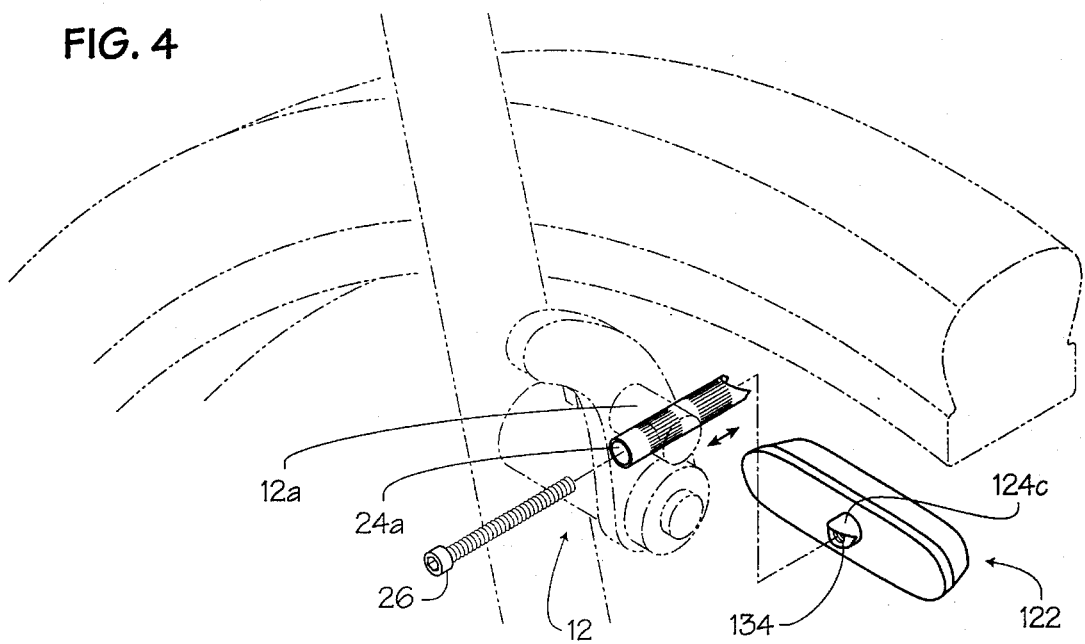
FIG. 4 is an exploded perspective view, similar to FIG. 3, showing the embodiment thereof with the parts in exploded relation.

Another embodiment is shown in FIGS. 3 and 4, where like parts are given like reference numerals. The primary difference in this embodiment is in the orientation means, in which the matingly configured portions are of another form. In this embodiment, the stem 124 has one end thereof formed with a V-shaped male edge while the pad 122 has affixed to the surface thereof or formed integrally therewith a stud 124c, having a matingly configured female V-shaped end so that when the parts are longitudinally aligned, they will not rotate relative to one another with the bolt 26 fitted through the bore into engagement with a threaded opening 134 of the stub 124c. This embodiment is likewise capable of receiving the pad in one of only two directions. This creates no problem when the pad 22 or 122 is non-directional. However, with a directional pad, in either embodiment, a skilled cyclist will naturally place the pad in the proper orientation and in either embodiment, replacement with a like pad will require no realignment.

By way of example, the hollow stems 24 and 124 are formed of metal, preferably aluminum. The spine or backbone of the pads about or onto which the frictional material is molded is formed of metal, such as aluminum, and correspondingly, the plate 30 and stub 124c will be formed of like or compatible metal.

While there have been shown and described preferred embodiments, it is to be understood that various other adaptations and modifications may be made within the spirit and scope of the invention.

What is claimed is:

1. A brake shoe assembly for attachment through an opening in a clamp device of a bicycle brake lever, the assembly comprising:

an elongate stem having a longitudinal axis, and having an aperture extending longitudinally therethrough, said stem having an outer configuration for frictional engagement within said opening;

an elongate brake pad having a rim engaging surface and orientation means on the surface thereof opposite said rim engaging surface, said orientation means and one end of said elongate stem being matingly configured so that when matingly adjoined, an orientation of said pad is defined relative to said axis; and a fastener configured for passing through said opening and said aperture in said stem into engagement with an opening generally centrally positioned within said orientation means for enabling fixing said pad in said orientation thereby to eliminate readjustment of a brake pad relative to the rim upon replacement with a like brake pad.

2. The assembly according to claim 1 wherein said orientation means includes a stub member and the mating configuration of said elongate stem and said one end of said support member is provided by a matingly coacting V-shaped end on each of said one end and said stub member.

3. The assembly according to claim 1 wherein said orientation means includes a geometrically configured non-circular recess formed in said surface and the mating configuration of said orientation means and said one end of said support member is provided by a matingly configured portion on said one end.

4. The assembly according to claim 3 wherein said geometrically configured recess is oval-shaped.

5. A brake shoe assembly for attachment through an opening in a clamp device of a bicycle brake lever, the assembly comprising:

an elongate tubular stem having an outer surface configured for frictional engagement within said opening;

an elongate brake pad having a rim engaging surface and a non-circular recess formed in the surface thereof opposite said rim engaging surface, one end of said stem having a portion matingly configured for being received with said recess so that when matingly adjoined, an orientation of said pad is defined relative to said axis;

a fastener member configured for passing through said opening and said tubular stem into engagement with an opening generally centrally positioned within said recess for enabling fixing said pad in said orientation thereby to eliminate realignment of a brake pad relative to the rim upon replacement with a like brake pad.

6. A brake shoe assembly for attachment through an opening in a clamp device of a bicycle brake lever, the assembly comprising:

an elongate tubular stem having an outer surface configured for frictional engagement within said opening and an end having an irregular configuration;

a brake pad having a rim engaging surface and a portion on the surface opposite said rim engaging surface said portion being matingly configured to said irregular configuration of said end so that when matingly adjoined, an orientation of said pad is defined relative to said axis; and a fastener member configured for passing through said opening and said tubular stem into engagement with an opening generally centrally positioned within said portion for enabling fixing said pad in said orientation thereby to eliminate readjustment of a brake pad relative to the rim upon replacement with a like brake pad.

7. The assembly of claim 6 wherein said irregular configuration includes matingly configured V-shaped ends of said stem end and said portion.

8. A brake assembly for a bicycle comprising:

a bicycle brake lever having a stem clamp device;

an elongate tubular stem secured to said clamp device, said stem having a non-circular end portion;

a brake pad having a rim engaging surface and an opposite surface with means on said opposite surface configured for mating engagement with said end portion so that when matingly adjoined, an orientation of said pad is defined relative to said axis; and a fastener configured for passing through the bore of said tubular stem into engagement with an opening generally centrally positioned within said means on said opposite surface for enabling fixing said pad in said orientation thereby to eliminate readjustment of a brake pad relative to the rim upon replacement with a like brake pad.

* * * * *